United States Patent
Araki et al.

(10) Patent No.: US 10,054,481 B2
(45) Date of Patent: Aug. 21, 2018

(54) ROTATING MACHINE ABNORMALITY DIAGNOSIS DEVICE, ROTATING MACHINE ABNORMALITY DIAGNOSIS METHOD, AND ROTATING MACHINE

(71) Applicant: Kobe Steel, Ltd., Hyogo (JP)

(72) Inventors: Kaname Araki, Kobe (JP); Eiji Takahashi, Kobe (JP); Tsuyoshi Ashida, Kobe (JP); Shugo Takaki, Takasago (JP); Yasuharu Matsumoto, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 86 days.

(21) Appl. No.: 15/327,831

(22) PCT Filed: Aug. 18, 2015

(86) PCT No.: PCT/JP2015/073116
§ 371 (c)(1),
(2) Date: Jan. 20, 2017

(87) PCT Pub. No.: WO2016/039085
PCT Pub. Date: Mar. 17, 2016

(65) Prior Publication Data
US 2017/0205276 A1   Jul. 20, 2017

(30) Foreign Application Priority Data

Sep. 12, 2014   (JP) .................... 2014-185820

(51) Int. Cl.
*G01M 13/00*   (2006.01)
*G01H 17/00*   (2006.01)

(52) U.S. Cl.
CPC ............ *G01H 17/00* (2013.01); *G01M 13/00* (2013.01)

(58) Field of Classification Search
CPC .............................. G01H 17/00; G01M 13/00
(Continued)

(56) References Cited

U.S. PATENT DOCUMENTS 7,860,663 B2 * 12/2010 Miyasaka .............. G01H 1/003
          702/113
8,473,252 B2 *  6/2013 Kar .................... G05B 23/0221
          340/679

(Continued)

FOREIGN PATENT DOCUMENTS

JP   S58-068626 A   4/1983
JP   H05-231361 A   9/1993
(Continued)

OTHER PUBLICATIONS

International Search Report issued in PCT/JP2015/073116; dated Nov. 10, 2015.
(Continued)

*Primary Examiner* — J M Saint Surin
(74) *Attorney, Agent, or Firm* — Studebaker & Brackett PC

(57) ABSTRACT

A rotating machine abnormality diagnosing apparatus for diagnosing an abnormality in a rotating machine includes: an analyzing part which performs a time-frequency analysis to a signal S representing intensity and time relationship of an elastic wave generating in the rotating machine; an extracting part which extracts second data representing intensity and time relationship of a predetermined frequency component from first data obtained by the time-frequency analysis; and a determining part which determines that a first rotor and a second rotor are in contact with each other when the second data contains intensity variation having a cycle represented by $T1 \times b = T2 \times a$, in which a rotational cycle of the first rotor is denoted by T1, a rotational cycle of the
(Continued)

second rotor is denoted by T2, and a ratio of a number of protrusions to a number of recesses is denoted by a:b.

5 Claims, 9 Drawing Sheets

(58) Field of Classification Search
USPC .......................................................... 73/579
See application file for complete search history.

(56) References Cited

U.S. PATENT DOCUMENTS

| | | | | |
|---|---|---|---|---|
| 8,768,534 | B2* | 7/2014 | Lentz | G05D 1/00 |
| | | | | 701/1 |
| 8,768,634 | B2* | 7/2014 | Fu | G01H 1/003 |
| | | | | 702/183 |
| 8,840,368 | B2* | 9/2014 | Mizoue | F03D 11/0091 |
| | | | | 416/35 |
| 9,476,803 | B2* | 10/2016 | Al-Najjar | G05B 23/024 |
| 2009/0266169 | A1* | 10/2009 | Marconnet | G01M 13/045 |
| | | | | 73/660 |

FOREIGN PATENT DOCUMENTS

| | | |
|---|---|---|
| JP | H08-166330 A | 6/1996 |
| JP | H09-133577 A | 5/1997 |
| JP | 2001-074616 A | 3/2001 |
| JP | 2010-234403 A | 10/2010 |

OTHER PUBLICATIONS

Notification of Transmittal of Copies of Translation of the International Preliminary Report on Patentability (Chapter I) and Translation of Written Opinion of the International Searching Authority; PCT/JP2015/073116; dated Mar. 23, 2017.

* cited by examiner

ROTATING MACHINE ABNORMALITY DIAGNOSIS DEVICE, ROTATING MACHINE ABNORMALITY DIAGNOSIS METHOD, AND ROTATING MACHINE

TECHNICAL FIELD

The present invention relates to a technology of diagnosing an abnormality inside a rotating machine which includes a first rotor and a second rotor arranged against the first rotor at a predetermined gap.

BACKGROUND ART

Various technologies for diagnosing an abnormality inside a rotating machine (for example, a compressor, a motor, or a power generator) have been proposed. For example, there has been proposed a diagnosing method for a compressor in which an AE wave generated by a contact between a male rotor and a female rotor of the rotating machine during rotation of the rotors and rotational signals of the rotors are detected simultaneously to thereby perform diagnosis about a contact between the rotors on the basis of the detected AE signal and rotational signals, the method being characterized by amplifying and demodulating the AE signal, performing a frequency analysis and arithmetic mean processing to the output, and comparing the result with a determination reference on the basis of the rotational signals to perform diagnosis about a contact between the rotors or the like (for example, see Patent Literature 1).

Also, there has been proposed an irregular contact detecting method for detecting an irregular contact state in a rotating machine which includes a first rotor and a second rotor rotating in a pair, the method being characterized by demodulating, an elastic wave signal output from the rotating machine, and determining that the rotors are in contact with each other if the demodulated elastic wave signal includes at least one of a rotational frequency component of the first rotor and a rotational frequency component of the second rotor at a predetermined or higher level, determining that a rotor is in contact with the casing if the demodulated wave signal contains a frequency component obtained by multiplying the number of blades of the first rotor and the rotational frequency of the rotor, and a frequency component obtained by multiplying the number of blades of the second rotor and the rotational frequency of the rotor, and determining that a rotor is in contact with a sealing member if a wave level of the elastic wave signal output from the rotating machine is larger than a predetermined level, but the mutual contact between the rotors and the contact between a rotor and the casing are not determined (for example, see, Patent Literature 2).

Further, there has been proposed an abnormality diagnosing apparatus in which an oscillation of a rotating machine is detected and then applied with a continuous wavelet transform, the transformed signal is added in a frequency axis direction, and an abnormality is determined based on the result of the addition (for example, see Patent Literature 3).

CITATION LIST

Patent Literature

Patent Literature 1: Japanese Unexamined Patent Publication No. HEI 5-231361

Patent Literature 2: Japanese Unexamined Patent Publication No. HEI 9-133577

Patent Literature 3: Japanese Unexamined Patent Publication No. 2001-74616

SUMMARY OF INVENTION

In a rotating machine which includes a first rotor, a second rotor arranged against the first rotor at a predetermined gap, and a casing for accommodating the first rotor and the second rotor, an abnormality being likely to happen in the rotating machine includes a contact between the first rotor and the second rotor, and another contact between one of the rotors and the casing. The former contact will directly lead to a breakdown of the rotating machine, and hence technology which makes it possible to accurately judge whether or not the first rotor and the second rotor are in contact with each other has been demanded.

The present invention has an object of providing a technology which makes it possible to accurately judge whether or not a first rotor and a second rotor are in contact with each other.

An abnormality diagnosing apparatus for a rotating machine according to one aspect of the present invention is a rotating machine abnormality diagnosing apparatus for diagnosing an abnormality in a rotating machine which includes a first rotor having a plurality of protrusions, and a second rotor having a plurality of recesses whose number is different from that of the protrusions and arranged against the first rotor at a predetermined gap so that corresponding protrusion and recess among the plurality of protrusions and recesses meet one another sequentially in accordance with rotation of the first rotor and the second rotor, the rotating machine abnormality diagnosing apparatus, including: a sensor which detects an elastic wave generating in the rotating machine, and outputs a signal representing intensity and time relationship of the elastic wave; an analyzing part which performs a time-frequency analysis to the signal output from the sensor; an extracting part which extracts second data representing intensity and time relationship of a predetermined frequency component from first data obtained by the time-frequency analysis of the analyzing part; and a determining part which determines that the first rotor and the second rotor are in contact with each other when the second data contains intensity variation having a cycle represented by $T1 \times b = T2 \times a$, in which a rotational cycle of the first rotor is denoted by $T1$, a rotational cycle of the second rotor is denoted by $T2$, and a ratio of the number of the protrusions and the number of the recesses is denoted by $a:b$.

The present invention can accurately judge whether or not the first rotor and the second rotor are in contact with each other.

DESCRIPTION OF EMBODIMENTS

Figure 1:
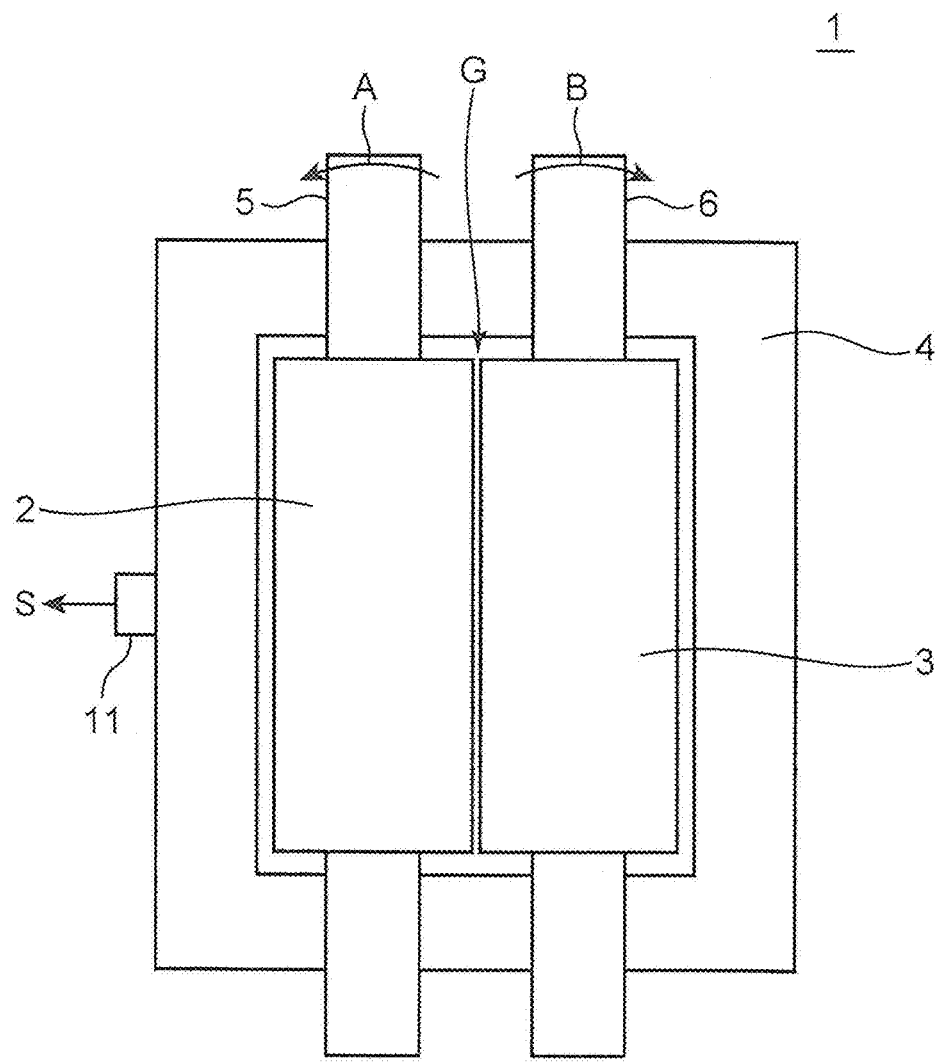
FIG. 1 is a schematic view showing an exemplary rotating machine.

Hereinafter, an embodiment of the present invention will be described with reference to the accompanying drawings. FIG. 1 is a schematic view showing an exemplary rotating machine 1. The rotating machine 1 includes a first rotor 2, a second rotor 3 arranged against the first rotor 2 at a predetermined gap G and a casing 4 for accommodating the first rotor 2 and the second rotor 3.

The first rotor 2 has a rotary shaft 5, and is driven to rotate about the rotary shaft 5 in the direction of arrow A (for example, a counterclockwise direction). The second rotor 3 has a rotary shaft 6, and is driven to rotate about the rotary shaft 6 in the direction of arrow B (for example, a clockwise direction).

The circumferential surface of the first rotor 2 is formed with a plurality of protrusions (not shown). The circumferential surface of the second rotor 3 is formed with a plurality of recesses (not shown). The recesses number is different from that of the protrusions. Hereinafter, the word "plurality of protrusions" means the plurality of protrusions formed on the circumferential surface of the first rotor 2, and the word "protrusion" means each one of the plurality of protrusions. The word "plurality of recesses" means the plurality of recesses formed on the circumferential surface of the second rotor 3, and the word "recess" means each one of the plurality of recesses.

Corresponding protrusions and recesses among the plurality of protrusions and recesses sequentially meet one another in accordance with the rotation of the first rotor 2 in the direction of arrow A and the second rotor 3 in the direction of arrow B. In other words, when the first rotor 2 rotates in the direction of arrow A and the second rotor 3 rotates in the direction of arrow B, a protrusion and a recess meet each other. The protrusion and recess move away from each other, and the succeeding protrusion and recess meet each other in accordance with advancement of the rotation. The succeeding protrusion and recess move away from each other, and the further succeeding protrusion and recess meet each other in accordance with further advancement of the rotation. Such meeting is repeated.

The meeting of a protrusion and a recess each other means that the protrusion is in the recess, but the protrusion and the recess are not in contact with each other and defines the gap G therebetween in a normal state. The contact between the protrusion and the recess means the contact between the first rotor 2 and the second rotor 3.

A sensor 11 is attached to an outer wall of the casing 4. The sensor 11 detects an elastic wave generating in the rotating machine 1, and outputs a signal S representing intensity and time relationship of the elastic wave. The elastic wave means, for example, an oscillatory wave or an ultrasonic wave.

Figure 2:
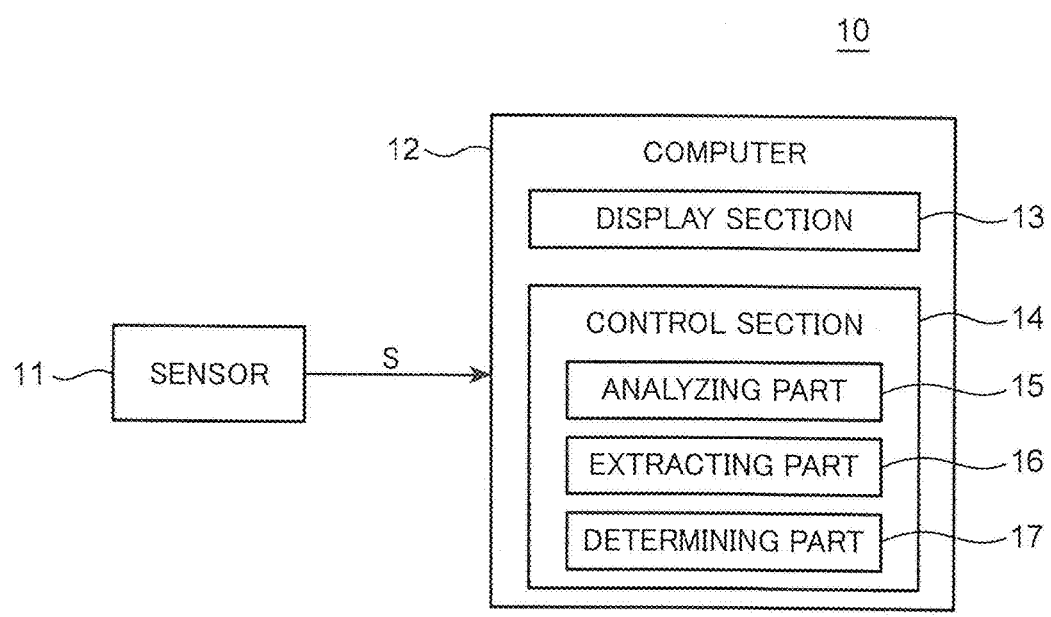
FIG. 2 is a block diagram showing, a configuration of a rotating machine abnormality diagnosing apparatus according to the present embodiment.

FIG. 2 is a block diagram showing a configuration of a rotating machine abnormality diagnosing apparatus 10 according to the present embodiment. The rotating machine abnormality diagnosing apparatus 10 includes a sensor 11 and a computer 12.

The rotating machine abnormality diagnosing apparatus 10 according to the present embodiment can detect (1) a contact between the first rotor 2 and the second rotor 3, (2) a contact between the first rotor 2 and the casing 4, and (3) a contact between the second rotor 3 and the casing 4 discriminately from one another.

The item (1) is the specific case that one of the plurality of protrusions and one of the plurality of recesses come into contact with each other when meeting each other during the rotation of the first rotor 2 and the second rotor 3. The item (2) is the specific case that some protrusions sequentially come into contact with a portion of the inner wall of the easing 4, or one of the plurality of protrusions comes into contact with a portion of the inner wall of the casing 4, during the rotation, of the first rotor 2 and the second rotor 3. The item (3) is the specific case that respective introduction portions of some recesses sequentially come into contact with a portion of the inner wall of the casing 4, or an introduction portion of one of the plurality of recesses comes into contact with a portion of the inner wall of the casing 4, during the rotation of the first rotor 2 and the second rotor 3.

The sensor 11 is adapted to detect the elastic waves generated by the contacts described in the items (1) to (3). When an ultrasonic wave generated by a contact is detected as an elastic wave, an AE (Acoustic Emission) sensor is used. When an oscillation generated by a contact is detected as an elastic wave, an oscillation sensor is used. In the present embodiment. The AE sensor is exemplified as the sensor 11.

The computer 12 includes a display section 13 and a control section 14. The display section 13 includes a display device such as a liquid crystal panel. The control section 14 has a CPU (Central Processing Unit), a ROM (Read Only Memory), and a RAM (Random Access Memory). The ROM stores various types of programs and software to execute diagnosing an abnormality in the rotating machine.

The control section 14 includes such function blocks as an analyzing part 15, an extracting part 16, and a determining part 17. These blocks will be described later.

Figure 3:
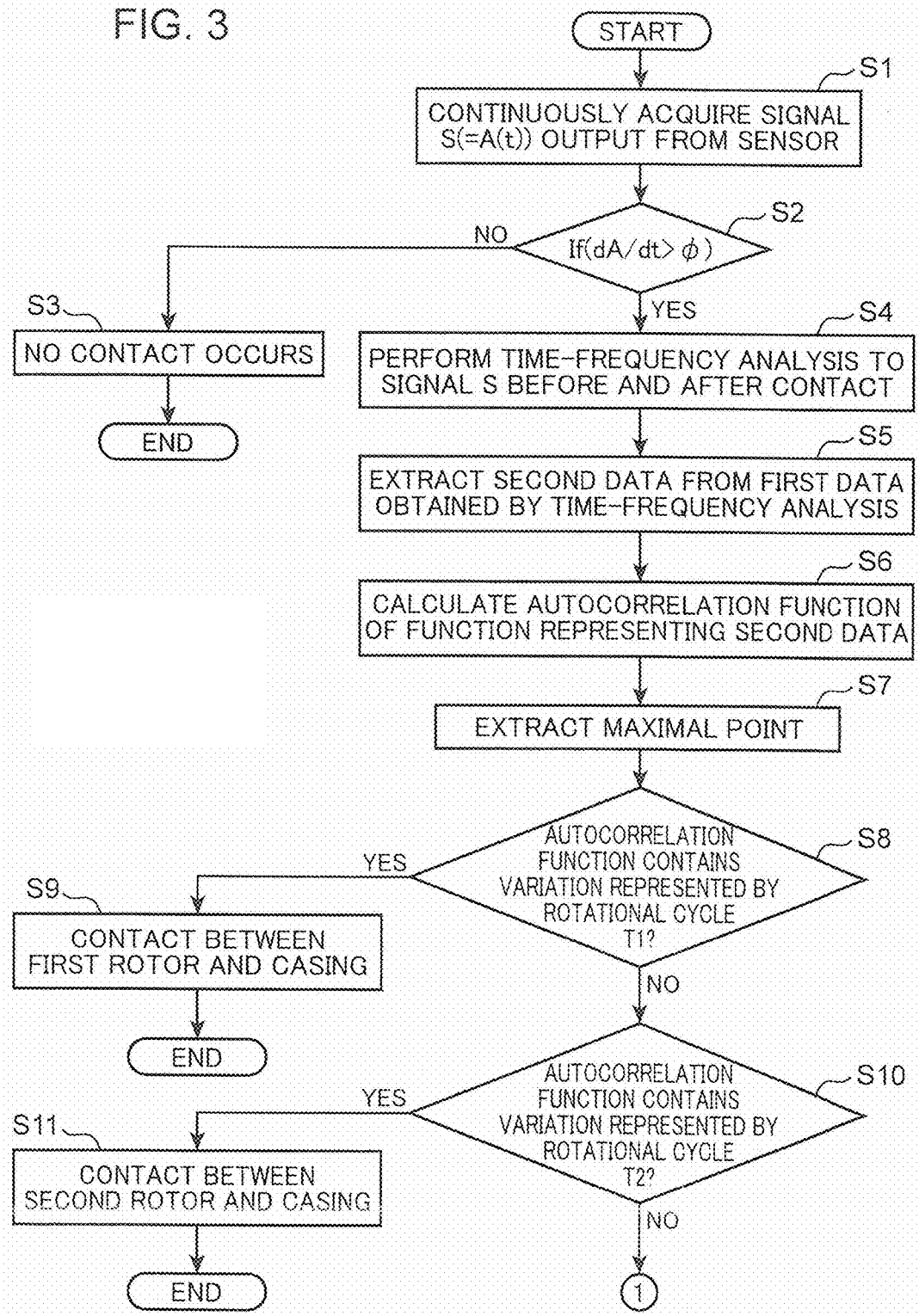
FIG. 3 is the former half of a flowchart, explaining an operation of the rotating machine abnormality diagnosing apparatus according to the present embodiment.
Figure 4:
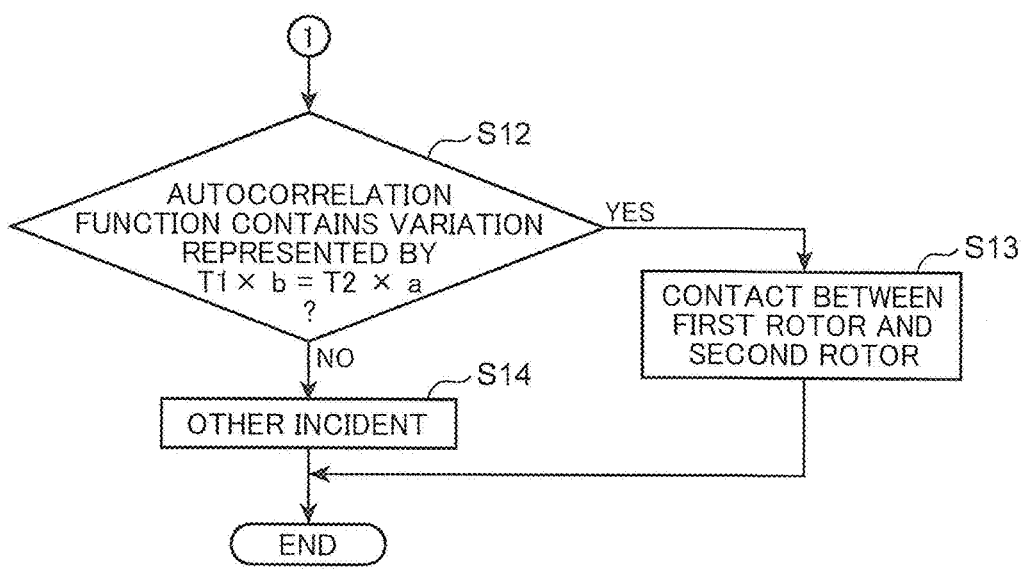
FIG. 4 is the latter half of the flowchart, explaining the operation of the rotating machine abnormality diagnosing apparatus according to the present embodiment.

An operation of the rotating machine abnormality diagnosing apparatus 10 according to the present embodiment will be described. FIGS. 3 and 4 show a flowchart explaining the operation. A rotational cycle of the first rotor 2 is denoted by T1, a rotational cycle of the second rotor is denoted by T2, and a ratio of the number of protrusions and the number of recesses is denoted by a:b.

The signals S output from the sensor 11 are continuously transmitted to the computer 12 during the rotation of the first rotor 2 and the second rotor 3, and the control section 14 continuously acquires the signals S (step S1).

The intensity of the signal S varies in a wide range of frequency bands at a beginning of each of the contacts between the first rotor 2 and the second rotor 3, between the first rotor 2 and the casing 4, and between the second rotor 3 and the casing 4. By utilizing these variations, a contact time is specified to be a time at which time based variation of the intensity of the signal S simultaneously occur in a plurality of frequency bands. In other words, a contact time is specified to be a time at which a value obtained by differentiating a function A (t) representing the signal S by time is larger than a predetermined threshold value The control section 14 judges whether or not there is an occasion where the value obtained by differentiating the function A(t) representing the signal S by time acquired in step S1 is larger than the predetermined threshold value φ (step S2). It should be noted that the contact time is specified in order to reduce the calculation amount of a time-frequency analysis to be described later. Hence, the specifying of the contact time is not indispensable processing to determine the aforementioned contacts described in the items (1) to (3).

When the control section 14 judges that there is no occasion where the value obtained by differentiating the function A(t) by time is larger than the threshold value φ (No in step S2), the determining part 17 determines that no contact occurs (step S3).

When the control section 14 judges that there is the occasion where the value obtained by differentiating the function A(t) by time is larger than the threshold value φ (Yes in step S2), the analyzing part 15 performs the time-frequency analysis to the portions of the signal S output from the sensor 11 that lie before and after the occasion, mainly, after the occasion (step S4). The time-frequency analysis is a processing of converting the signal S output from the sensor 11 into informative data representing a time and frequency relationship by using a short-time Fourier transform or a wavelet transform.

Figure 5:
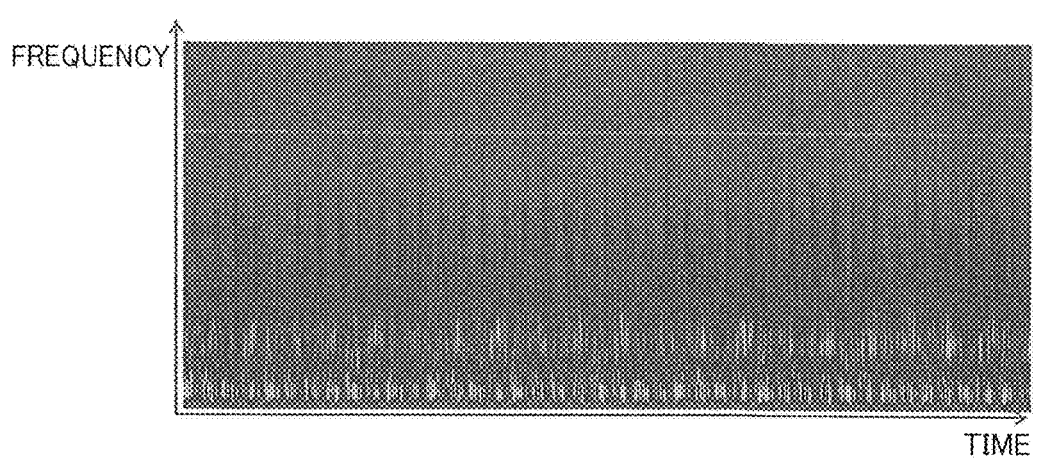
FIG. 5 is a graph showing exemplary data (first data) obtained by performing a time-frequency analysis to a signal output from a sensor.

FIG. 5 is a graph showing exemplary data (first data) obtained by performing the time-frequency analysis to the signal S output from the sensor 11. The lateral axis indicates the time, and the vertical axis indicates the frequency. In FIG. 5, white segments indicate frequency components having a high intensity, and gray segments indicate frequency components having a low intensity. It is understood that low frequency components have an increased intensity. This means that the low frequency components contain many noises caused by an oscillation peculiar to the rotating machine 1.

In the time-frequency analysis, the analysis time interval is set to a value which sufficiently assures time division into a rotational cycle T1 of the first rotor 2, a rotational cycle T2 of the second rotor 3, and a cycle represented by a rotational cycle T1×b (i.e. a cycle represented by a rotational cycle T2×a).

When the signal S contains many noises or variations, the control section 14 may be appreciated to be provided with a noise reduction processing part to first perform noise reduction processing to the signal S. Subsequently, the analyzing part 15 may perform, the time-frequency analysis to the processed signal S. The noise reduction processing includes movement average processing and envelope processing, for example.

Figure 6:
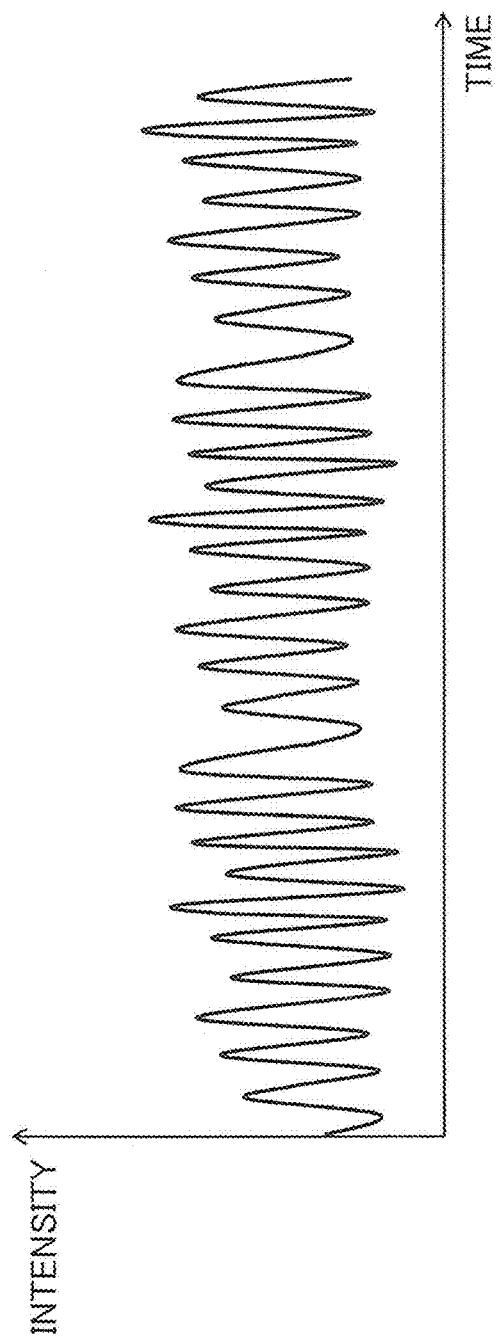
FIG. 6 is a graph showing a first exemplary function representing data (second data) extracted by an extracting part.
Figure 7:
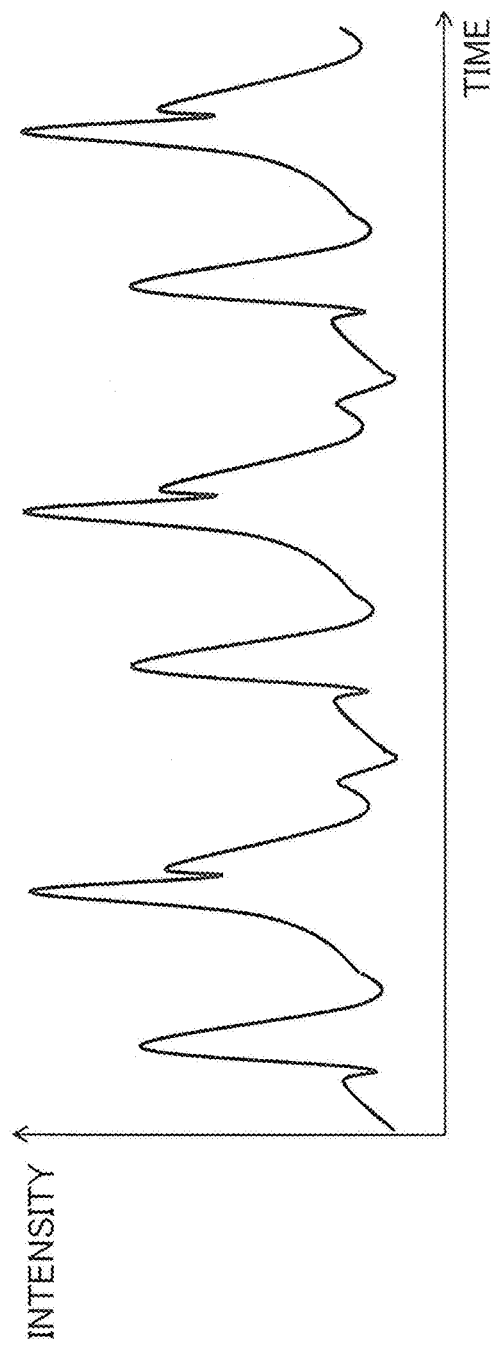
FIG. 7 is a graph showing a second exemplary function representing data (second data) extracted by the extracting part.

The extracting part 16 extracts second data representing a relationship between the intensity of the predetermined frequency component and the time by using the results of the time-frequency analysis of the analyzing part 15 (step S5). In other words, the extracting part 16 extracts the second data from the first data. As described above, the lower frequency component is likely to contain many noises. Hence, it is preferable to select a frequency component containing fewer noises (for example, 150 kHz or more) as the predetermined frequency component. In the present embodiment, the frequency component having 200 kHz is selected. Accordingly, the extracting part 16 extracts the data of the frequency component having 200 kHz in FIG. 5, FIG. 6 is a graph showing a first exemplary function representing the second data extracted by the extracting part 16. FIG. 7 is a graph showing a second exemplary function representing the second data extracted by the extracting part 16. The lateral axis indicates the time, and the vertical axis indicates the intensity of the frequency component having 200 kHz.

As described later, FIG. 6 shows a contact between the first rotor 2 and the casing 4 or a contact between the second rotor 3 and the casing 4, and FIG. 7 shows a contact between the first rotor 2 and the second rotor 3.

Figure 8:
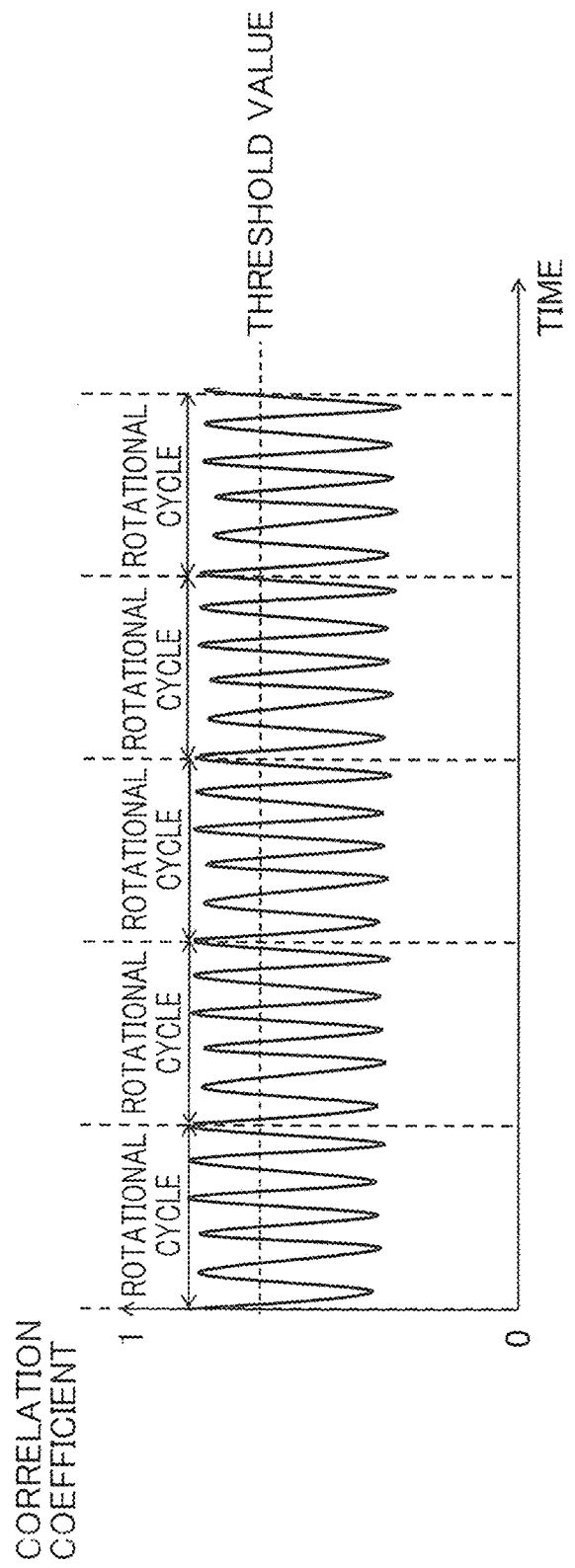
FIG. 8 is a graph showing an autocorrelation function of the function represented by the graph of FIG. 6.
Figure 9:
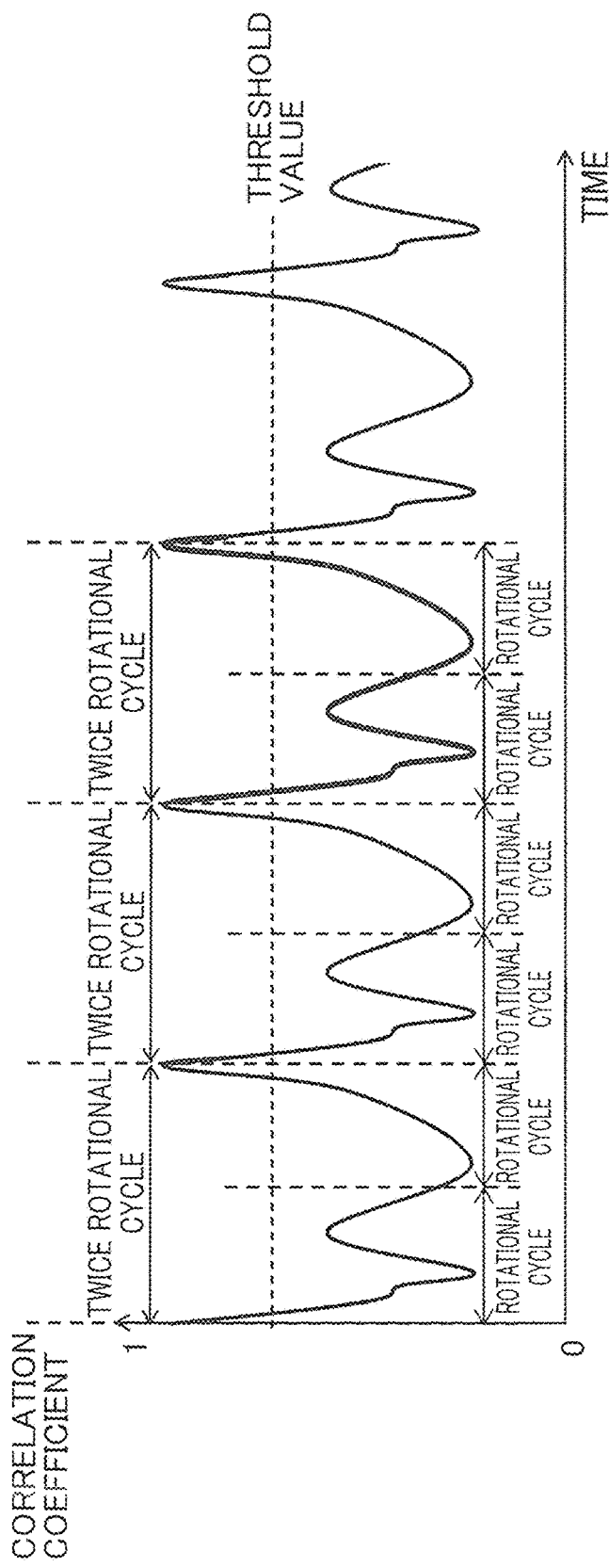
FIG. 9 is a graph showing an autocorrelation function of the function represented by the graph of FIG. 7.

The determining part 17 calculates an autocorrelation function of a function representing the second data in order to clarify a cyclicity of the function (step S6). FIG. 8 is a graph showing an autocorrelation function of the function representing the graph of FIG. 6. FIG. 9 is a graph showing an autocorrelation function of the function representing the graph of FIG. 7. In each of FIGS. 8 and 9, the lateral axis indicates the time, and the vertical axis indicates the correlation coefficient. Further, the cyclicity of the data can be confirmed by using a cross-correlation function or the Fourier transform.

The determining part 17 extracts a maximal point of the correlation coefficient which is larger than a predetermined threshold value (for example, 0.9) in the autocorrelation function calculated in step S6 (step S7). The threshold value should not be limited to 0.9, but can be set to an optimal value depending on the rotating machine 1 for which abnormality diagnosis is performed.

The determining part 17 determines whether or not the autocorrelation function calculated in step S6 contains intensity variation represented by the rotational cycle T1 of the first rotor 2 (step S8). The maximal point extracted in step S7 is utilized for this determination. For example, as shown in FIG. 8, the determining part 17 determines that the autocorrelation function calculated in step S6 contains the intensity variation represented by the rotational cycle 11 when determining that the same number of maximal points occur in each rotational cycle T1 (Yes in step S8). This is the determination that a contact occurs between the first rotor 2 and the casing 4. Accordingly, the control section 14 notifies the contact between the first rotor 2 and the casing 4 by using the display section 13 (step S9).

Next, the determining part 17 determines whether or not the autocorrelation function calculated in step S6 contains intensity variation represented by the rotational cycle T2 of the second rotor 3 (step S10) when determining that the autocorrelation function calculated in step S6 does not contain the intensity variation represented by the rotational cycle T1 (No in step S8). The maximal point extracted in step S7 is utilized for this determination. For example, as shown in FIG. 8, the determining part 17 determines that the autocorrelation function calculated in step S6 contains the intensity variation represented by the rotational cycle T2 when determining that the same number of maximal points occur in each rotational cycle T2 (Yes in step S10). This is the determination that a contact occurs between the second rotor 3 and the casing 4. Accordingly, the control section 14 notifies the contact between the second rotor 3 and the casing 4 by using the display section 13 (step S11).

The determining part 17 determines whether or not the autocorrelation function calculated in step S6 contains intensity variation having a cycle represented by T1×b=T2×a (step S12) when determining that the autocorrelation function calculated in step S6 does not contain the intensity variation represented by the rotational cycle T2 (No in step S10). The maximal point extracted in step S7 is utilized for this determination. For example, the ratio a:b of the plurality of protrusions and recesses is set at 1:2, the rotational cycle T1 is set at 20 msec. and the rotational cycle T2 is set at 40 msec. For example, as shown in FIG. 9, the determining part 17 determines that the autocorrelation function calculated in step S6 contains intensity variation having a cycle represented by T1×b=T2×a when determining that the maximal point occurs in each 40 msec (=20 msec×2) (Yes in step S12). This is the determination that a contact occurs between the first rotor 2 and the second rotor 3. Accordingly, the control section 14 notifies the contact between the first rotor 2 and the second rotor 3 by using the display section 13 (step S13).

The determining part 17 determines that other incident occurs except the contacts between the first rotor 2 and the casing 4, between the second rotor 3 and the casing 4, and between the first rotor 2 and the second rotor 3, when determining that the autocorrelation function calculated in step S6 does not contain the intensity variation having a cycle represented by T1×b=T2×a (No in step S12). Accordingly, the control section 14 notifies the incident by using the display section 13 (step S14).

In the previous description, the second data extracted in step S5 is one second data. However, it is possible to use a plurality of second data. In this case, the determining part 17 determines respective contacts between the first rotor 2 and the casing 4, between the second rotor 3 and the casing 4, and between the first rotor 2 and the second rotor 3 by using the plurality of second data. In the case that the second data extracted in step S5 is one second data, if the data contains a noise, it is likely to be difficult to correctly determine the aforementioned contacts. The determination of the contacts using the plurality of second data respectively will be seen to ensure more correct determination of the contacts.

If the cyclicity of the function representing the second data is clear, step 6 may be omitted. In this case, the processing in step S7 and succeeding processing thereafter are executed for the function representing the second data. Therefore, the determining part 17 determines that the first rotor 2 and the casing 4 are in contact with each other when the function representing the second data contains intensity variation having a cycle represented by T1, and determines that the second rotor 3 and the casing 4 are in contact with each other when the function representing the second data contains intensity variation having a cycle represented by T2, and determines that the first rotor 2 and the second rotor 3 are in contact with each other when the intensity function representing the second data contains intensity variation having a cycle represented by T1×b=T2×a.

Significant advantageous effects of the present embodiment will be described. A contact between the first rotor 2 and the second rotor 3 may be determined by data which is obtained by performing the fast Fourier transform to a signal S output from the sensor 11, and extracting data having a frequency component having a predetermined intensity from the transformed data. For the contact between the first, rotor 2 and the second rotor 3, rather than a contact between each protrusion and each recess occuring when the corresponding protrusion and recess meet each other during the rotation of the first rotor 2 and the second rotor 3, it will be more likely that a contact occurs between a certain protrusion among the plurality of protrusions and a certain recess among the plurality of recesses are in contact with each other when they meet each other.

Specifically, in a case where a first rotor 2 having a first protrusion, a second protrusion and a third protrusion, and a second rotor 3 having a first recess and a second recess are rotated, sequentially, the first protrusion and the first recess meet each other, the second protrusion and the second recess meet each other, the third protrusion and the first recess meet each other, the first protrusion and the second recess meet each other, the second protrusion and the first recess meet each other, the third protrusion and the second recess meet each other, and these meetings are then repeated. Less contact occurs at each meeting, but it is likely to cause a contact at, a special meeting, for example, the meeting of the third protrusion and the first recess.

Denoting the rotational cycle of the first rotor 2 by T1, the rotational cycle of the second rotor 3 by T2, and the ratio of the plurality of protrusions and recesses by a:b, a signal S output from the sensor 11 will have intensity variation in the above-mentioned latter meeting at a cycle of T1×b=T2×a. The present inventors have found that, since data, obtained by performing the fast Fourier transform to the signal S has no time information, it is difficult to correctly determine whether or not a predetermined frequency component contains intensity variation having a cycle of T1×b=T2×a.

Taking this difficulty into consideration, in the rotating machine abnormality diagnosing apparatus 10 according to the present embodiment, the time-frequency analysis is performed to the signal S output from the sensor 11, second data representing a relationship between intensity and time of the predetermined frequency component is then extracted from the first data obtained by the time-frequency analysis, and a contact between the first rotor 2 and the second rotor 3 is determined by utilizing the second data. Since the second data contains time information, it is possible to correctly determine whether or not the second data (i.e. The predetermined frequency component) contains intensity variation having a cycle of T1×b=T2×a. In this manner, the rotating machine abnormality diagnosing apparatus 10 according to the present embodiment can correctly determine whether or not the first rotor 2 and the second rotor 3 are in contact with each other.

Furthermore, according to the present embodiment, it is possible to determine the contact between the first rotor 2 and the casing 4, and the contact between the second rotor 3 and the casing 4 discriminately from each other, as described for steps S8, S9, S10, and S11.

The intensity variation having the cycle represented by T1×b=T2×a as shown in FIG. 9 contains the intensity variation having the cycle represented by T1 and the intensity variation having the cycle represented by T2. Hence, in the present embodiment, it is first determined whether or not the autocorrelation function contains the intensity variation having the cycle represented by T1 or the intensity variation having the cycle represented by T2 (step S8, S10), and it is subsequently determined whether or not the autocorrelation function contains the intensity variation having the cycle represented by T1×b=T2×a (step S12). In this manner, it is possible to correctly determine whether or not the autocorrelation function contains the intensity variation having the cycle represented by T1×b=T2×a.

The rotating machine 1 for which abnormality diagnosis is performed by the rotating machine abnormality diagnosing apparatus 10 according to the present embodiment includes a compressor, for example. However, the rotating machine I should not be limited to compressors.

(Summary of the Present Embodiment)

An abnormality diagnosing apparatus for a rotating machine according to the first aspect is a rotating machine abnormality diagnosing apparatus for diagnosing an abnormality inside a rotating machine which includes a first rotor having a plurality of protrusions, and a second rotor having a plurality of recesses whose number is different from that of the protrusions and arranged against the first rotor at a predetermined gap so that corresponding protrusion and recess among the plurality of protrusions and recesses meet one another sequentially in accordance with rotation of the first rotor and the second rotor, the rotating machine abnormality diagnosing apparatus, including: a sensor which detects an elastic wave generating in the rotating machine, and outputs a signal representing intensity and time relationship of the elastic wave; an analyzing part which performs a time-frequency analysis to the signal output from the sensor; an extracting part which extracts second data representing intensity and time relationship of a predetermined frequency component from first data obtained by the time-frequency analysis of the analyzing part; and a determining part which determines that the first rotor and the second rotor are in contact with each other when the second data contains intensity variation having a cycle represented by $T1 \times b = T2 \times a$, in which a rotational cycle of the first rotor is denoted by $T1$, a rotational cycle of the second rotor is denoted by $T2$, and a ratio of the number of the protrusions and the number of the recesses is denoted by $a:b$.

The meeting of a protrusion and a recess each other means that the protrusion is in the recess, but the protrusion and the recess are not in contact with each other and defines the gap therebetween in a normal state. The contact between the protrusion and the recess means the contact between the first rotor and the second rotor.

A contact between the first rotor and the second rotor may be determined by data which is obtained by performing the fast Fourier transform to a signal output front the aforementioned sensor for detecting an elastic wave, and extracting data having a frequency component having a predetermined intensity from the transformed data. For the contact between the first rotor and the second rotor, rather than a contact between each protrusion and each recess happening when the corresponding protrusion and recess meet each other during the rotation of the first rotor and the second rotor, it will be more likely that a contact occurs between a certain protrusion among the plurality of protrusions and a certain recess among the plurality of recesses are in contact with each other when they meet each other.

Specifically, in a case where a first rotor having a first protrusion, a second protrusion and a third protrusion, and a second rotor having a first recess and a second recess are rotated, sequentially, the first protrusion and the first recess meet each other, the second protrusion and the second recess meet each other, the third protrusion and the first recess meet each other, the first protrusion and the second recess meet each other, the second protrusion and the first recess meet each other, and the third protrusion and the second recess meet each other, and these meetings are then repeated. Less contact occurs at each meeting, but it is likely to cause a contact at a special meeting, for example, the meeting of the third protrusion and the first recess.

Here, denoting the rotational cycle of the first rotor by $T1$, the rotational cycle of the second rotor by $T2$, and the ratio of the plurality of protrusions and recesses by $a:b$, a signal output from the sensor will have intensity variation in the above-mentioned latter meeting at a cycle of $T1 \times b = T2 \times a$. The present inventors have found that since data obtained by performing the fast Fourier transform to the signal has no time information, it, is difficult to correctly determine whether or not a predetermined frequency component contains intensity variation having a cycle of $T1 \times b = T2 \times a$.

Taking this difficulty into consideration, in the rotating machine abnormality diagnosing apparatus according to the first aspect, the time-frequency analysis is performed to the signal output from the sensor for detecting an elastic wave, second data representing a relationship between intensity of the predetermined frequency component and a time is then extracted from the first data obtained by the time-frequency analysis, and a contact between the first rotor and the second rotor is determined by utilizing the second data. Since the second data contains time information, it is possible to correctly determine whether or not the second data (i.e. The predetermined frequency component) contains intensity variation having a cycle of $T1 \times b = T2 \times a$. In this manner, the rotating machine abnormality diagnosing apparatus according to the first aspect can correctly determine whether or not the first rotor and the second rotor are in contact with each other.

In the above-described configuration, the rotating machine further includes a casing for accommodating the first rotor and the second rotor, and the determining part determines that the first rotor and the casing are in contact with each other when the second data contains intensity variation having a cycle represented by $T1$, and determines that the second rotor and the casing are in contact with each other when the second data contains intensity variation having a cycle represented by $T2$.

In this configuration, it is possible to determine the contact between the first rotor and the casing, and the contact between the second rotor and the casing discriminately from each other.

In the above-described configuration, the determining part determines whether or not the first rotor and the second rotor are in contact with each other, after determining whether or not the first rotor and the casing are in contact with each other, and whether or not the second rotor and the casing are in contact with each other.

The intensity variation having the cycle represented by $T1 \times b = T2 \times a$ contains the intensity variation having the cycle represented by $T1$ and the intensity variation having the cycle represented by $T2$. Here, it is determined whether or not the second data contains the intensity variation having the cycle represented by $T1$ or the intensity variation having the cycle represented by $T2$, and it is subsequently determined whether or not the second data contains the intensity variation having the cycle represented by $T1 \times b = T2 \times a$. In this manner, it is possible to correctly determine whether or not the second data contains the intensity variation having the cycle represented by $T1 \times b = T2 \times a$.

An abnormality diagnosing method for a rotating machine according to the second aspect is a rotating machine abnormality diagnosing method for diagnosing an abnormality in a rotating machine which includes a first rotor having a plurality of protrusions, and a second rotor having a plurality of recesses whose number is different from that of the protrusions and arranged against the first rotor at a predetermined gap so that the protrusions and the recesses meet one another sequentially in accordance with rotation of the first rotor and the second rotor, the rotating machine abnormality diagnosing method, including: a detecting step of detecting an elastic wave generating in the rotating machine, and outputting a signal representing intensity and time relationship of the elastic wave; an analyzing step of performing a time-frequency analysis to the signal output in the detecting step; an extracting step of extracting second data representing intensity and time relationship of a predetermined frequency component from first data obtained by the time frequency analysis in the analyzing step; and a determining step of determining that the first rotor and the, second rotor are in contact with each other when the second data contains intensity variation having a cycle represented by $T1 \times b = T2 \times a$, in which a rotational cycle of the first rotor is denoted by $T1$, a rotational cycle of the second rotor is denoted by T2, and a ratio of the number of the protrusions and the recesses is denoted by a:b.

The rotating machine abnormality diagnosing method according to the second aspect can correctly determine whether or not the first rotor and the second rotor are in contact with each other by the same reasons described for the rotating machine abnormality diagnosing apparatus according to the first aspect.

A rotating machine according to the third aspect includes the rotating machine abnormality diagnosing apparatus according to the above-described aspects.

The invention claimed is:

1. A rotating machine abnormality diagnosing apparatus for diagnosing an abnormality inside a rotating machine which includes a first rotor having a plurality of protrusions, and a second rotor having a plurality of recesses whose number is different from that of the protrusions and arranged against the first rotor at a predetermined gap so that corresponding protrusion and recess among the plurality of protrusions and recesses meet one another sequentially in accordance with rotation of the first rotor and the second rotor, the rotating machine abnormality diagnosing apparatus, comprising:
   a sensor which detects an elastic wave generating in the rotating machine, and outputs a signal representing intensity and time relationship of the elastic wave;
   an analyzing part which performs a time-frequency analysis to the signal output from the sensor;
   an extracting part which extracts second data representing intensity and time relationship of a predetermined frequency component from first data obtained by the time-frequency analysis of the analyzing part; and
   a determining part which determines that the first rotor and the second rotor are in contact with each other when the second data contains intensity variation having a cycle represented by $T1 \times b = T2 \times a$, in which a rotational cycle of the first rotor is denoted by T1, a rotational cycle of the second rotor is denoted by T2, and a ratio of the number of the protrusions and the number of the recesses is denoted by a:b.

2. A rotating machine abnormality diagnosing apparatus according to claim 1, wherein
   the rotating machine further includes a casing for accommodating the first rotor and the second rotor, and the determining part determines that the first rotor and the casing are in contact with each other when the second data contains intensity variation having a cycle represented by T1, and determines that the second rotor and the casing are in contact with each other when the second data contains intensity variation having a cycle represented by T2.

3. A rotating machine abnormality diagnosing apparatus according to claim 2, wherein
   the determining part determines whether or not the first rotor and the second rotor are in contact with each other, after determining whether or not the first rotor and the casing are in contact with each other, and whether or not the second rotor and the casing are in contact with each other.

4. A rotating machine abnormality diagnosing method for diagnosing an abnormality inside a rotating machine which includes a first rotor having a plurality of protrusions, and a second rotor having a plurality of recesses whose number is different from that of the protrusions and arranged against the first rotor at a predetermined gap so that corresponding protrusion and recess among the plurality of protrusions and recesses meet one another sequentially in accordance with rotation of the first rotor and the second rotor, the rotating machine abnormality diagnosing method, comprising:
   a detecting step of detecting an elastic wave generating in the rotating machine, and outputting a signal representing intensity and time relationship of the elastic wave;
   an analyzing step of performing a time-frequency analysis to the signal output in the detecting step;
   an extracting step of extracting second data representing intensity and time relationship of a predetermined frequency component from first data obtained by the time-frequency analysis in the analyzing step; and
   a determining step of determining that the first rotor and the second rotor are in contact with each other when the second data contains intensity variation having a cycle represented by $T1 \times b = T2 \times a$, in which a rotational cycle of the first rotor is denoted by T1, a rotational cycle of the second rotor is denoted by T2, and a ratio of the number of the protrusions and the recesses is denoted by a:b.

5. A rotating machine including the rotating machine abnormality diagnosing apparatus according to claim 1.

* * * * *